(12) United States Patent
Driessen (10) Patent No.: US 9,902,246 B1
(45) Date of Patent: Feb. 27, 2018

(54) ROOF CLOSURE ASSEMBLY AND A WIND DEFLECTOR ARRANGEMENT

(71) Applicant: Inalfa Roof Systems Group B.V., Oostrum (NL)

(72) Inventor: Leonardus Antonius Driessen, Sevenum (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 0 days.

(21) Appl. No.: 15/425,700

(22) Filed: Feb. 6, 2017

(30) Foreign Application Priority Data

Aug. 31, 2016 (DE) .................... 20 2016 104 784 U (51) Int. Cl.
 *B60J 7/22* (2006.01)
 *B60J 7/043* (2006.01)

(52) U.S. Cl.
 CPC ............. *B60J 7/22* (2013.01); *B60J 7/0435* (2013.01)

(58) Field of Classification Search
 CPC .......................................... B60J 7/22
 USPC ........................................ 296/217
 See application file for complete search history.

(56) References Cited

U.S. PATENT DOCUMENTS

| | | | |
|---|---|---|---|
| 8,459,729 B1 * | 6/2013 | Nania .......................... | B60J 7/22 296/217 |
| 8,590,963 B2 * | 11/2013 | Nowack ..................... | B60J 7/22 296/217 |
| 8,931,830 B2 * | 1/2015 | Vogel .......................... | B60J 7/22 296/217 |
| 9,168,816 B2 * | 10/2015 | Bertholee ................... | B60J 7/22 |
| 2012/0086239 A1 | 4/2012 | Uehara | |

FOREIGN PATENT DOCUMENTS

| | | |
|---|---|---|
| DE | 102004043620 A1 | 3/2006 |
| DE | 102011103980 A1 | 12/2012 |
| WO | 2010083789 A1 | 7/2010 |

OTHER PUBLICATIONS

German Search Report dated May 17, 2017 for German application No. 202016104784.6

* cited by examiner

*Primary Examiner* — Dennis H Pedder
(74) *Attorney, Agent, or Firm* — Steven M. Koehler; Westman, Champlin & Koehler, P.A.

(57) ABSTRACT

A roof closure assembly for a vehicle having a roof opening, comprises a stationary part and a closure. A wind deflector arrangement includes an elongated wind deflector body having two ends which are connected to arm assemblies movably coupled to the stationary part and engagable by the closure in order to move the wind deflector body when the closure moves near a closed position. Each arm assembly comprises an arm connected between the wind deflector body and the stationary part, the arm being movably connected with respect to the stationary part and being biased by a first spring in a substantially rearward direction. An auxiliary arm is connected between the arm and the stationary part whereby the auxiliary arm is movably connected with respect to the stationary part. The auxiliary arm is biased with respect to the stationary part by a second spring into a substantially forward direction.

20 Claims, 5 Drawing Sheets

ROOF CLOSURE ASSEMBLY AND A WIND DEFLECTOR ARRANGEMENT

BACKGROUND

The discussion below is merely provided for general background information and is not intended to be used as an aid in determining the scope of the claimed subject matter.

The present invention relates to a roof closure assembly for a vehicle having a roof opening in its fixed roof including a stationary part to be attached to the vehicle roof, a closure configured to close the roof opening and to move at least to an open position rearward of the closed position, and a wind deflector arrangement movable between an upper active position in which it protrudes above the vehicle roof and a lower inactive position in which it is retracted below the fixed roof.

Such roof closure assemblies are known. For instance WO 2010/083789 discloses such a wind deflector (WD) arrangement having a wind deflector body and on each lateral end of the wind deflector body, arm assemblies. The arm assemblies each comprise an arm which is movably attached to a stationary part and further an auxiliary arm on one end pivotally connected to the arm and on an opposite end movably connected to the stationary part. The arm is biased by a first spring near the movable connection with the stationary part and further the auxiliary lever is biased by an elastic member which biases the auxiliary arm in a vertical direction when the wind deflector arrangement is in its lower inactive position. So when the wind deflector is in its upper active position this elastic member is no longer biasing the auxiliary arm, and the biasing force for the wind deflector arrangement is now only derived from the first spring. Such roof closure assembly opened in a situation whereby the vehicle drives at a high speed for instance up to 320 kilometers per hour will most probably have difficulties to deploy the wind deflector arrangement above the fixed roof surface or to keep the wind deflector at a certain required height above the fixed roof due to the high aerodynamic load on the wind deflector arrangement.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they in-tended to be used as an aid in determining the scope of the claimed subject matter. The claimed subject matter is not limited to implementations that solve any or all disadvantages noted in the Background.

According to one aspect of the invention, the auxiliary arm is biased with respect to the stationary part by a second spring into a substantially forward direction. The auxiliary arm may be rotatably and slidably connected to the stationary part, such that the auxiliary arm slides in a forward direction with respect to the stationary part when the arm rotates upwardly. The auxiliary arm may be rotatably connected to the arm, by means of a pivot connection. The second spring may urge a lower part of the auxiliary arm in a forward direction with respect to the stationary part and the second spring may be attached to the auxiliary arm at a position centrally between the pivot parts with which the auxiliary arm is able to slide and rotate with respect to the stationary part. And further the arm may be rotatably and slidably connected to the stationary part such that the arm slides rearwardly with respect to the stationary part when the arm rotates upwardly. So when the wind deflector arrangement is raised from a lower inactive position into an upper active position the lower part of the arm is moved under influence of the biasing force of the first spring into a rearward direction such that ultimately a pair of first pivot members around which the arm is rotatably and slidable movable, slides to the rear end of a first slot hole part. Simultaneously the lower part of the auxiliary arm is moved into a longitudinal forward direction under the biasing influence of the second spring whereby second pivot members around which the auxiliary arm is rotatably and slidably movable, slides to the front end of a second slot hole. So when the wind deflector arrangement is in its upper active position, both the arm and the auxiliary arm are in a position in which the lower parts of the respective arms are pressed by the biasing forces of the respective springs against the ends of the respective slot holes. This gives a stable basis for the wind deflector arrangement when the arrangement is subjected to high wind load forces generated when the vehicle drives with high speed. So the advantage is that the wind deflector arrangement and more precisely the wind deflector body in such conditions is supported well enough to maintain a certain required height above the fixed roof.

According another aspect of the body, the wind deflector arrangement may comprise the first spring acting between the lower part of the arm and the stationary part and extending substantially parallel to the lower part of the arm such that the arm is biased to its rear most position. The first spring may be attached on one end to the inside of the arm and on an opposite end to the stationary part to an attachment positioned between the first pivot members. Because one of the ends of the first spring is attached to the arm the biasing force will always be directed in a substantial parallel direction to the arm regardless the position of the arm. The advantage of such an aspect is that the spring can be hidden inside the arm and is therefore hardly visible and also the spring does not take up any other packing space, such as when the spring would be attached on the outside of the arm such as shown in the above mentioned prior art document.

According to yet another aspect of the invention, the first spring may have a lower spring rate than the second spring, as a matter of fact the spring rate of the first spring may lie in the range of 10% to 95% lower than the spring rate of the second spring. The magnitude of the first and the second spring rate are selected such that when the wind deflector arrangement is moved from a lower inactive position to an upper active position, in a first phase, the stronger second spring urges the lower part of the auxiliary arm to slide and rotate in a forward direction and simultaneously in this first phase the arm only rotates. In a second phase, the auxiliary arm only rotates further in an upward direction and under biasing influence of the weaker first spring the arm slides and rotates into a rearward respectively upward direction. So the spring rate of the second spring must be higher than the spring rate of the first spring to enable the wind deflector arrangement to move upward from an inactive to an upper active position. Upon closure of the wind deflector arrangement the closure, when moving to the closed position, engages the arms and because of the lower spring rate of the first spring this is a smooth engagement without generation of high forces that may withstand the cover and which may generate reversal movements of the cover due to the effects of a anti trap system.

According to another aspect of the invention the auxiliary arm may be connected to the arm such that in the upper active position of the wind deflector arrangement the angle between a centerline through the auxiliary arm and a centerline through the second slot hole lies in the range of 30 to 90 degrees. With such angle conditions the wind deflector arrangement can withstand the high wind load forces generated at high vehicle speed. A further advantage is that when the same concept wind deflector arrangement is used on another vehicle and for instance the wind deflector arrangement height above the roof needs to be increased because of a different outside vehicle shape, in such occasion this can be easily done by using the same parts which would mean that the angle between the centerline of the auxiliary arm and a centerline through the second slot hole in such situation would have to be increased when the wind deflector arrangement is in its upper active position.

According to another aspect of the invention the auxiliary arm may have a shape similar to a hockey stick, wherein the pivot connection may be positioned at an offset distance to a centerline through a second slot hole and wherein a second spring may bias second pivot members in a forward direction along a centerline through the second slot hole causing a biasing force to the pivot connection in an upward direction. Thus, due to the shape of the auxiliary arm and the second spring a torque is provided to the auxiliary arm and upper pivot with the arm to move the wind deflector to an upper active position. Also the shape of the auxiliary lever is made such that in the lower inactive position the auxiliary arm fits neatly on top of the part comprising the second slot hole i.e. the stationary part.

According to yet another aspect of the invention, the wind deflector arms may be adapted to be engaged by a forward edge of the closure in a first phase and are adapted to be engaged by a slide pad attached to the closure in a second phase in order to move the wind deflector body towards the lower inactive position when the closure moves towards the closed position. Due to the geometry and angle of the wind deflector arms, upon movement of the closure towards the closed position, the first protruding part of the closure engaging the wind deflector arm is the forward edge of the closure. The angle between a centerline of the arm and a horizontal is chosen such that in the first phase of the engagement between closure and wind deflector arm the force applied on the closure is rather low, to such extent that a reversal movement of the cover due to a false anti trap detection is avoided. In a second phase the auxiliary lever has been rotated to a lower position which results in a reduced force to push the wind deflector arm in a downward direction, a slide part attached to the cover protruding in a downward direction pushes the wind deflector arm further downward into the inactive position of the wind deflector arrangement. Due to the shape of the protruding slide pad the wind deflector arm is pushed down in a quicker way, to make space for the closure to close the roof opening. To avoid that the wind deflector arm is pushed down too far, a matching cavity is created into the wind deflector arm in which the protruding slide pad of the cover fits when the cover arrives in its closed position.

According to yet another aspect of the invention, the wind deflector body and the stationary part may also be connected by a flexible netting or mesh extending substantially the full width of the wind deflector body. The netting or mesh limits the upward movement of the wind deflector body and under the influence of the biasing force from the first and second springs, the arm stays in its upward active position and in that position keeps the netting or mesh taut, even under high wind load conditions caused by high vehicle speeds.

DETAILED DESCRIPTION

Figure 1:
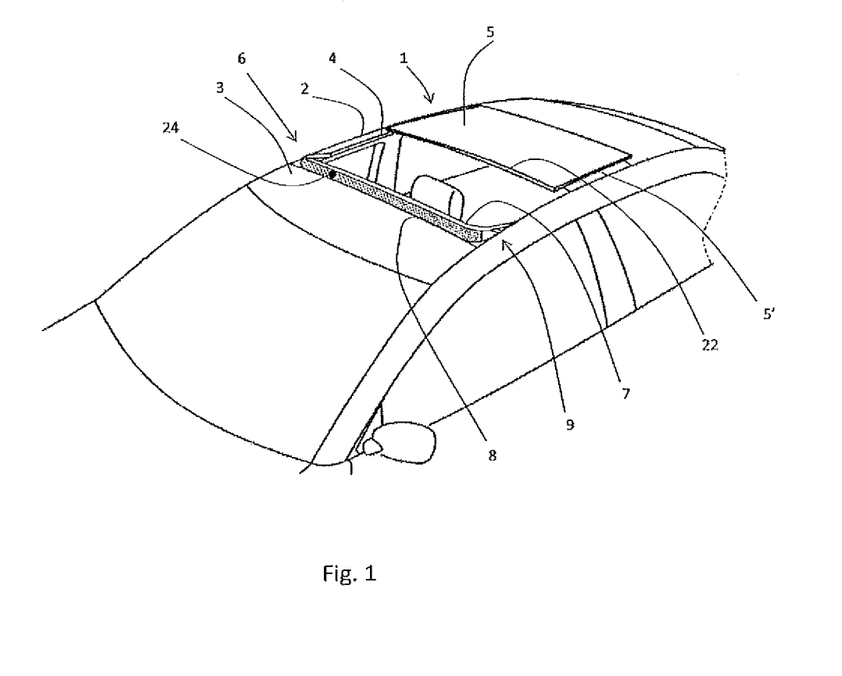
FIG. 1 is a perspective view of a vehicle having a roof closure assembly in its fixed roof.
Figure 2:
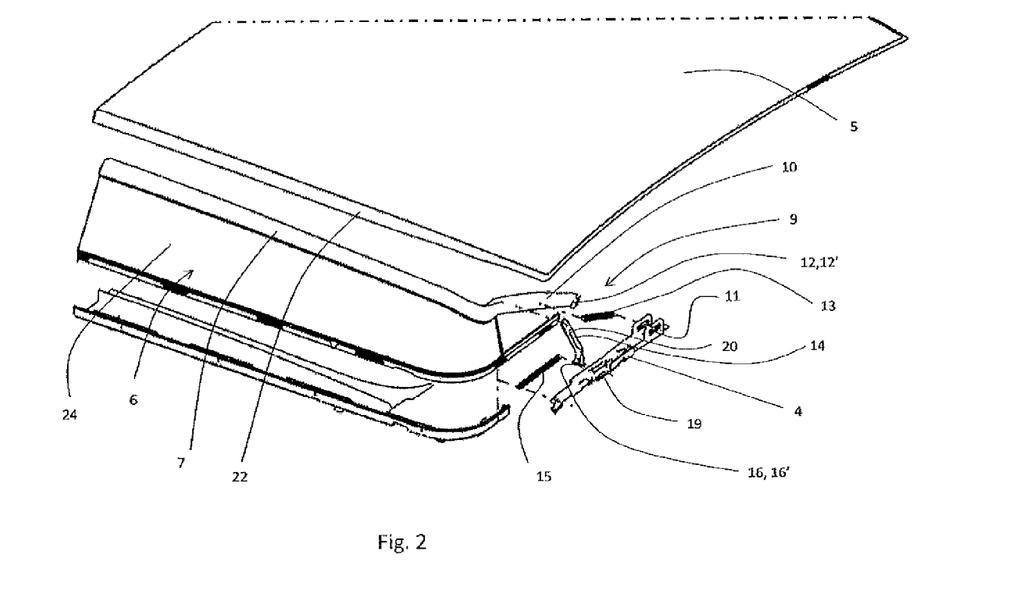
FIG. 2 is an exploded view showing the wind deflector arrangement and the cover partly.

FIG. 1 illustrates a vehicle having a roof closure assembly 1 in its fixed roof 3. The fixed roof 3 of the vehicle comprises a roof opening 2. The roof closure assembly 1 comprises at least one, but here two closures 5, 5' manufactured for example from glass or plastic material, and the closures 5, 5' may be a rigid panel which is at least partly transparent. At least the front closure 5 can be moved for selectively closing and at least partially opening said roof opening 2 by a movement of an operating mechanism along a stationary part 4, such as guide rails on a frame, in a manner known in the art. In the embodiment shown, the front closure 5 is a so called top slider roof panel (or can be a spoiler roof panel) which is movable from its closed position within the roof opening 2 rearwardly and upwardly, but closure 5 may also slide downwardly and rearwardly, (as a so called tilt/vent slide roof panel) or comprises a foldable roof cover or a number of slats or the like.

Within the circumference, but below the level of the roof opening 2, a wind deflector arrangement 6 is mounted, preferably just behind the front edge 8 of the roof opening 2. The wind deflector assembly 6 comprises at least one, and preferably two wind deflector arms 10, which are each pivotally connected with a first end to the stationary part 4, and which carries at a second end a wind deflector body 7 extending between the wind deflector arms 10 in a transverse direction with respect to the vehicle longitudinal axis, and further a pair of auxiliary arms 14 pivotally connected to the arms 10. Said wind deflector arrangement 6 is movable between a first upper active position in which it is operative and in which the wind deflector body 7 is positioned above the surface of the fixed roof 3, and a second, inactive position in which the wind deflector body 7 is positioned in a storage position, in a so called storage space, below the surface of the fixed roof 3, i.e. below the roof opening 2. The closure 5 is capable of moving the wind deflector arrangement 6 to at least the second position.

Figure 3:
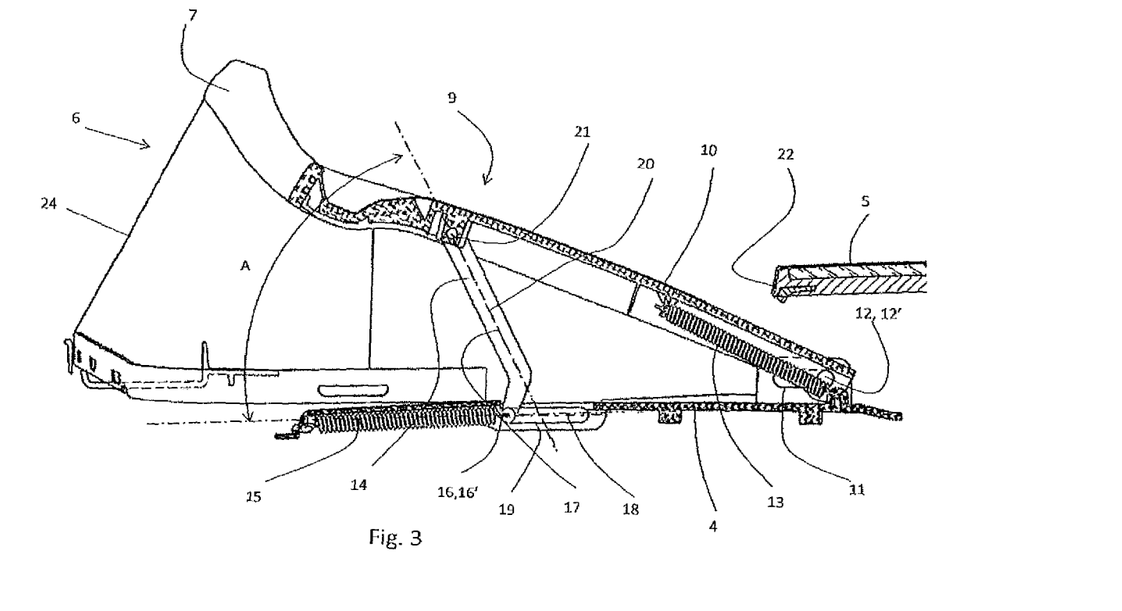
FIGS. 3 and 4 are enlarged side views of the wind deflector arrangement respectively showing the upward active position and the downward inactive position.

As is shown in the drawings for instance in FIG. 3, wind deflector arm 10 is fixedly attached at its upper or forward end to, and might be integral with wind deflector body 7, while the rear lower end of arm 10 is rotatably and slidably connected to stationary part 4. In the embodiment shown for instance in FIG. 3, arm 10 is provided with first pivot members 12, 12' slidably engaging a first slot hole part 11, which in this case is closed and straight and extends in longitudinal direction of the vehicle, such that the lower end of arm 10 can move rearwardly and forwardly. First pivot members 12, 12' comprises two pivots extending of opposite lateral sides of the arm 10 in opposite directions and each pivot engages in a slot of first slot hole part 11. The slots are provide in two upwardly extending walls in the stationary part 4 which are spaced to each other such that arm 10 in vicinity of first pivot members 12, 12' fits in between the walls. A first spring 13 biases the lower end of arm 10 in rearward direction, which in this case leads to a biasing force on the wind deflector arm 10 and body 7 in a rearward direction. Spring 13 has a first connection point within the arm 10 and an opposite second connection point on the stationary part 4. The second connection point of spring 13 lies in close proximity of the rearmost end part of first slot hole 11. As such the spring 13 biases the arm 10 in a rearward direction but always also in a direction substantially parallel to the arm 10 regardless of its position.

The drawings further show that wind deflector arrangement 6 comprises at each arm 10 an auxiliary arm 14 together forming an arm assembly 9, 9'. This auxiliary arm 14 is rotatably connected at its upper end to arm 10 (here by pivot 21) and at its rear end slidably and rotatably connected to the stationary part 4, by second pivot members 16, 16'. The point of connection of pivot 21 between auxiliary arm 14 and arm 10 is positioned at a location between the ends of arm 10 and may vary with the design of the wind deflector arrangement 6. Preferably the pivot connection 21 lies at approximately 60% of the distance measured in a side elevation such as in FIG. 3, between the first pivot members 12, 12' and the front most part of the wind deflector body 7. Second pivot members 16, 16' comprise two pivots extending of opposite lateral sides of the auxiliary arm 14 in opposite directions and each pivot engages in a slot of second slot hole 19. The slots are provided in two upwardly extending walls in the stationary part 4 which are spaced to each other such that auxiliary arm 14 in the vicinity of the second pivot members 16, 16' fits in between the walls. A second spring 15 biases the auxiliary arm 14 in forward direction. Spring 15 has a first connection point to the auxiliary arm 14, seen in a side elevation such as FIG. 3 positioned right in between second pivot members 16, 16' and an opposite second connection point on the stationary part 4. The first connection point of spring 13 lies on a centerline through second slot hole 19.

Figure 4:
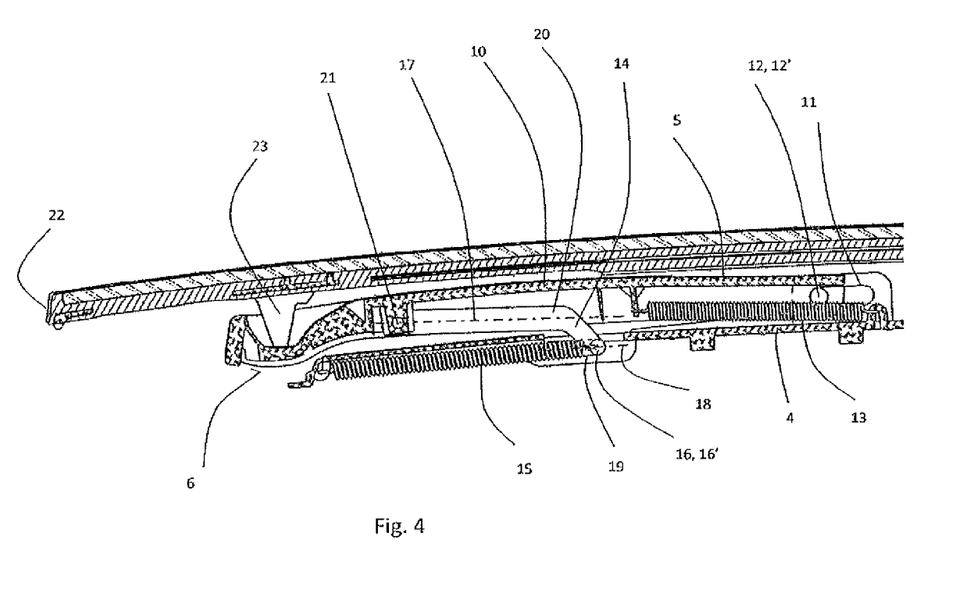

As can be seen in FIG. 4, the wind deflector arrangement 6 lies in its inactive position below closure 5, which is in its closed position. Slide pad 23 attached to the underside of the closure 5 pushes the wind deflector arrangement 6 in a downward direction against the biasing force of second spring 15. Second spring 15 applies this biasing force to the lower part of the auxiliary arm 14 in a substantially forward direction. Second pivot members 16, 16' are positioned in the substantially rearmost part of second slot hole 19. The auxiliary arm 14 is provided with main body 20 and the lower part to which the second pivot members 16, 16' are attached. The upper part of the auxiliary arm 14 has the pivot connection 21 with the arm 10, the lower part is connected to the biasing second spring 15. The biasing force applied to the lower part is directed substantially in a forward direction parallel to a center line through the second slot hole 19. Pivot connection 21 lies at an offset distance to the centerline 18. This offset distance causes the biasing force of second spring 15 actually to create a torque around second pivot members 16, 16', biasing the upper part of the auxiliary arm 14 and therewith the pivot connection 21 to rotate around second pivot members 16, 16' in an upward rotational direction. The generally hockey stick shaped auxiliary arm 14 is shaped beneficially in that the auxiliary arm 14 fits neatly between the stationary part 4 and the arm 10 which lies just below the lower side of closure 5, which results in a tight vertical packaging of the parts involved.

Figure 5:
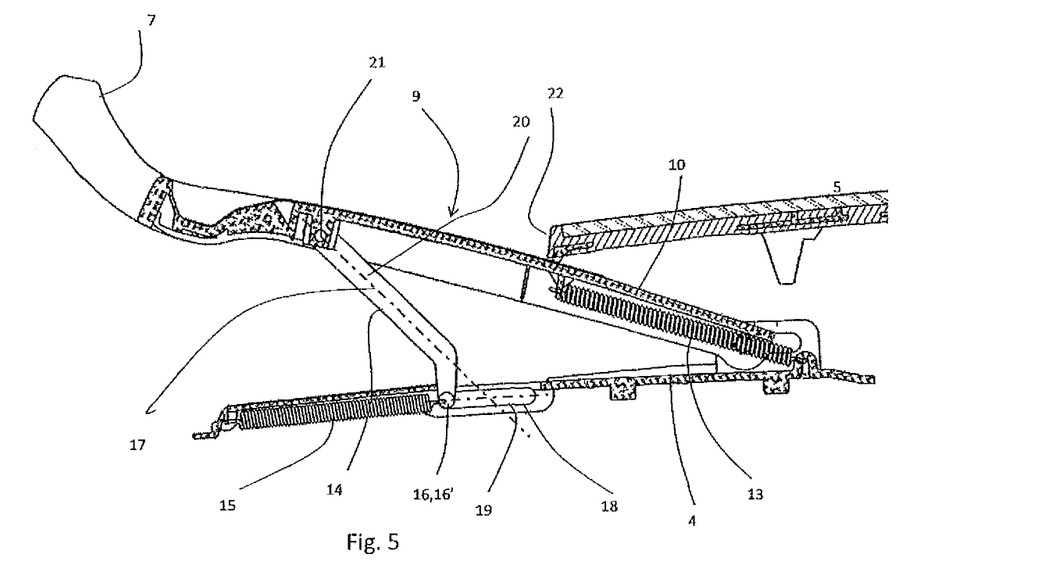
FIG. 5 is a side view corresponding to that of FIGS. 3 and 4, but showing the wind deflector arrangement in an intermediate position.

In FIG. 5 a position has been drawn in which the wind deflector arrangement 6 has been rotated into an intermediate position between the inactive and the active position. To reach this position the closure has been moved a certain distance to the rear thus allowing the wind deflector arrangement 6 to move from the inactive position in an upward direction. The actual movement of the closure 5 is not in a straight line to the rear, it is in a curvature whereby from the closed position the closure 5 in a first phase goes in an upward and rearward direction and in a second subsequent phase goes rearwards along a substantially straight line. In the position of the closure 5 shown in FIG. 5 the wind deflector arrangement 6 has been rotated around the first pivot members 12, 12', which members are still positioned in the front part of first slot hole 11. The lower part of the auxiliary arm 14 has been moved from a position in the rearmost part of the second slot hole 19 towards the front side under the influence of the biasing force of second spring 15 and has reached now the forward edge 22 of the second slot hole 19.

First spring 13 has a lower spring rate than second spring 15. The spring rate of the first spring 13 lies in the range of 10% to 95% lower than the spring rate of the second spring 15, however in an preferred embodiment first spring 13 has a spring rate of between 0.7 N/mm and 0.85 N/mm and second spring 15 has a spring rate of between 1.45 N/mm and 1.8 N/mm. Other spring rates are possible, for instance in another embodiment the spring rates may lie higher or lower than the preferred embodiment, but still lie within the above mentioned range of 10%-95% relative to each other.

The position in FIG. 5 of the wind deflector arrangement 6 shows, when the closure 5 is moving to an open position, the position in which the auxiliary arm 14 is pushed to the front most edge of the second slot hole 19 and as such, from this position to a more upward position of the wind deflector arrangement 6, the auxiliary arm 14 can now only rotate further upward. Arm 10, from this position upon a further movement of the closure 5 to the rear, is now able to move rearward, whereby the first pivot members 12, 12' slide rearwardly through first slot hole 11 under the influence of the rearward directed biasing force of first spring 13. Also it is noted that in the position shown in FIG. 5 the slide pad 23 which was in engagement with the wind deflector arrangement 6 in its inactive position is now no longer in engagement and the engagement has now been taken over by the front part of the closure 5. So between the inactive position of the wind deflector arrangement 6 and the position shown in FIG. 5 the engagement of the slide pad has been taken over by the front part of the closure 5. The rearward movement of the closure 5 leads ultimately to a position in which closure 5 is not in engagement with arms 10 anymore. As from this particular position the wind deflector arrangement 6 is now in its fully active position, whereby wind deflector body 7 is well above the fixed roof 3 and held in position by the connection to the netting 24.

The active position as is drawn in FIG. 3 shows the first pivot members 12, 12' in their rear most position in first slot hole 11 and as such the arms 10 are blocked from further movement and the wind deflector is now in its highest position. The auxiliary arm 14 is connected to the arm 10 such that in the upper active position of the wind deflector arrangement 6 the angle between a centerline 17 through the auxiliary arm 14 and a centerline 18 through the second slot hole 19 part lies in the range of 30 to 90 degrees. However in a more preferred range the angle is between 50 and 65 degrees. In this position both first spring 13 and second spring 15 are still urging a biasing force on the respective arm 10 and auxiliary arm 14, thus applying a biasing force in an upward direction. This biasing force is able to withstand all of the aerodynamic forces that are applied to the wind deflector arrangement 6 from driving the vehicle with an open closure 5 at very high speeds. As such the wind deflector arrangement 6 stays in an active position above the fixed roof 3 and does not move downwardly or does not collapse all together by the aerodynamic forces.

When the closure 5 is closed again, the individual movements of the parts of the wind deflector arrangement 6 are carried out in a reversed direction.

The mesh or netting 24 extends the full width of wind deflector body 7 and may also extend around the corners. The netting 24 is attached to the wind deflector body 7 and if extending around the corners also attached to the arms 10. Furthermore the netting 24 is fixed to a lower net fixing part which is in turn connected to the stationary part 4.

The stationary part 4 may be a separate part as shown in the drawings which is attached to the lateral guides or the frame of the roof closure 5 assembly 1, it may also be integrated into the lateral guides. The stationary part 4 may be a plastic or a metal part.

The springs are helical springs typically made of steel, preferably of hardened steel.

The slide pad 23 and the front part of the closure 5 are typically made of plastic material such as PU or PVC or the like and are incorporated into the remainder of the encapsulation part extending circumferentially around the edges of the closure 5.

From the foregoing it will be clear that the invention provides a roof closure and wind deflector arrangement 6 which increases stability of wind deflector arrangement 6 in an active position above the fixed roof 3 surface under influence of aerodynamic forces caused by high vehicle speeds.

The invention is not limited to the embodiments shown in the drawings and described above, and can be varied in different manners within the scope of the appended claims. Although the wind deflector assembly has been described as having an arm assembly at each end, it would be conceivable to have only one arm assembly 9, 9' as described, for example in the middle and two other stabilizing arrangement at the ends of the wind deflector body 7.

Also it is conceivable that the angle between the centre line 17 through the auxiliary arm 14 and the centre line 18 through the second slot hole 19 in an active position of the wind deflector arrangement 6 extends from 30 degrees to 135 degrees, whereby the main body 20 of the auxiliary arm 14 in situations of such larger angles is orientated perpendicularly to arm 10 when the wind deflector arrangement is in its active position.

What is claimed is:

1. A roof closure assembly for a vehicle having a roof opening in its fixed roof, comprising:
    a stationary part to be attached to the fixed roof;
    a closure configured to close the roof opening in a closed position and to move at least to an open position rearward of the closed position; and
    a wind deflector arrangement movable between an upper active position in which it protrudes above the fixed roof and a lower inactive position in which it is retracted below the fixed roof, the wind deflector arrangement including:
        a transverse elongate wind deflector body configured to be arranged near a front side of a roof opening in the fixed roof, said wind deflector body having two ends;
        a pair of arm assemblies, each arm assembly comprising
            an arm connected to each end of the wind deflector body and slidably and rotatably coupled to the stationary part and configured to be engaged by the closure in order to move the wind deflector body when the closure moves near the closed position;
            a first spring configured to slidably bias the arm with respect to the stationary part in a substantially rearward direction;
            an auxiliary arm connected between the arm and the stationary part whereby the auxiliary arm is movably connected with respect to the stationary part; and
            a second spring configured to bias the auxiliary arm with respect to the stationary part into a substantially forward direction.

2. The roof closure assembly according to claim 1, wherein the auxiliary arm is rotatably and slidably connected to the stationary part, such that the auxiliary arm slides in a forward direction with respect to the stationary part when the arm rotates upwardly.

3. The roof closure assembly according to claim 1, wherein the auxiliary arm is rotatably connected to the arm with a pivot connection.

4. The roof closure assembly according to claim 1, wherein the arm slides rearwardly with respect to the stationary part when the arm rotates upwardly.

5. The roof closure assembly according to claim 1, wherein the first spring acts between a lower part of the arm and the stationary part and extends substantially parallel to the lower part of the arm such that the arm is biased to its rear most position.

6. The roof closure assembly according to claim 2, wherein the second spring urges a lower part of the auxiliary arm in a forward direction with respect to the stationary part and wherein the second spring is attached to the auxiliary arm at a position centrally between pivot parts with which the auxiliary arm is able to slide and rotate with respect to the stationary part.

7. The roof closure assembly according to claim 1, wherein a first spring rate of the first spring is lower than a second spring rate of the second spring.

8. The roof closure assembly according to claim 7, wherein the first spring rate of the first spring is in a range of about 10% to about 95% lower than the second spring rate of the second spring.

9. The roof closure assembly according to claim 1, wherein the auxiliary arm is connected to the arm such that in the upper active position of the wind deflector arrangement an angle between a center line through the auxiliary arm and a center line through an arm auxiliary slot at the stationary part is in a range of about 30 to about 90 degrees.

10. The roof closure assembly according to claim 7, wherein a magnitude of the first and the second spring rates are selected such that when the wind deflector arrangement is moved from a lower inactive position to an upper active position, in a first phase, the second spring is stronger than the first spring and urges a lower part of the auxiliary arm to slide and rotate in a forward direction and simultaneously the arm rotates and in a second phase, the auxiliary arm rotates further in an upward direction and under biasing influence of the first spring the arm slides and rotates into a rearward respectively upward direction.

11. The roof closure assembly according to claim 1, wherein the auxiliary arm is rotatably and slidably connected to the stationary part within a slot, such that the auxiliary arm slides in a forward direction with respect to the stationary part when the arm rotates upwardly, wherein the auxiliary arm is rotatably connected to the arm with a pivot connection, wherein the auxiliary arm has a shape similar to a hockey stick wherein the pivot connection is positioned at an offset distance to a centerline through the slot and wherein the second spring biases a second pivot connection in a forward direction along centerline causing a biasing force to the pivot connection in an upward direction.

12. The roof closure assembly according to claim 1, wherein the arms of the wind deflector arrangement are configured to be engaged by a forward edge of the closure in a first phase and are configured to be engaged by a slide pad attached to the closure in a second phase in order to move the wind deflector body towards the lower inactive position when the closure moves towards the closed position.

13. The roof closure assembly according to claim 1, wherein the wind deflector body and the stationary part are also connected by a flexible netting or mesh extending substantially a full width of the wind deflector body.

14. A wind deflector arrangement for a roof closure assembly in a vehicle having a roof opening in its fixed roof, the wind deflector arrangement movable between an upper active position in which it protrudes above the fixed roof and a lower inactive position in which it is retracted below the fixed roof, the wind deflector arrangement comprising:
- a transverse elongate wind deflector body configured to be arranged near a front side of a roof opening in the fixed roof, said wind deflector body having two ends;
- a pair of arm assemblies, each arm assembly comprising:
  - an arm connected to each end of the wind deflector body and slidably and rotatably coupled to a stationary part of the roof closure assembly and configured to be engaged by a closure in order to move the wind deflector body when the closure moves near a closed position in which the closure closes the roof opening
  - a first spring configured to bias the arm with respect to the stationary part in a substantially rearward direction;
  - an auxiliary arm connected between the arm and the stationary part whereby the auxiliary arm is movably connected with respect to the stationary part; and
  - a second spring configured to bias the auxiliary arm with respect to the stationary part into a substantially forward direction.

15. The roof closure assembly according to claim 14, wherein the auxiliary arm is rotatably and slidably connected to the stationary part, such that the auxiliary arm slides in a forward direction with respect to the stationary part when the arm rotates upwardly.

16. The roof closure assembly according to claim 14, wherein the auxiliary arm is rotatably connected to the arm with a pivot connection.

17. The roof closure assembly according to claim 14, wherein the arm slides rearwardly with respect to the stationary part when the arm rotates upwardly.

18. The roof closure assembly according to claim 14, wherein the first spring acts between a lower part of the arm and the stationary part and extends substantially parallel to the lower part of the arm such that the arm is biased to its rear most position.

19. The roof closure assembly according to claim 15, wherein the second spring urges a lower part of the auxiliary arm in a forward direction with respect to the stationary part and wherein the second spring is attached to the auxiliary arm at a position centrally between pivot parts with which the auxiliary arm is able to slide and rotate with respect to the stationary part.

20. The roof closure assembly according to claim 14, wherein a first spring rate of the first spring is lower than a second spring rate of the second spring.

* * * * *